United States Patent [19]

Tanimoto et al.

[11] Patent Number: 5,426,490

[45] Date of Patent: Jun. 20, 1995

[54] SOLID STATE SCANNING DEVICE

[75] Inventors: Koji Tanimoto, Kawasaki; Naoaki Ide, Yokohama, both of Japan

[73] Assignee: Kabushiki Kaisha Toshiba, Kawasaki, Japan

[21] Appl. No.: 120,071

[22] Filed: Sep. 13, 1993

[30] Foreign Application Priority Data

Sep. 18, 1992 [JP] Japan .................. 4-249916

[51] Int. Cl.⁶ .......................................... G03G 15/04
[52] U.S. Cl. .......................................... 355/229; 355/1
[58] Field of Search ..................... 355/1, 229

[56] References Cited

U.S. PATENT DOCUMENTS

| | | | |
|---|---|---|---|
| 4,505,570 | 3/1985 | Inokuchi | 355/237 |
| 4,549,784 | 10/1985 | Inokuchi | 355/1 X |
| 4,767,172 | 8/1988 | Nichols et al. | 355/1 X |

OTHER PUBLICATIONS

Nikkei Microdevices, p. 129, Dec. 1, 1991.

*Primary Examiner*—Fred L. Braun
*Attorney, Agent, or Firm*—Foley & Lardner

[57] ABSTRACT

An exposure apparatus having a transparent base member opposed to a photosensitive drum and forming part of a vacuum chamber, an electrode formed in the vacuum chamber for discharging thermoelectrons, a fluorescent member formed on the base member for emitting light when receiving the thermoelectrons, an anode for supplying the fluorescent member with a potential for colliding the thermoelectrons against the fluorescent member, the anode shaping the configuration of light emitted from the fluorescent member, and a microlens formed in the base member in contact with the fluorescent member, for converging onto the photosensitive drum the light emitted from the fluorescent member. When thermoelectrons are discharged from the electrode, the fluorescent member emits light, which has a configuration limited by the anode and is efficiently converged onto the photosensitive drum through the microlens formed in the base member in contact with the fluorescent member, to perform exposure.

5 Claims, 5 Drawing Sheets

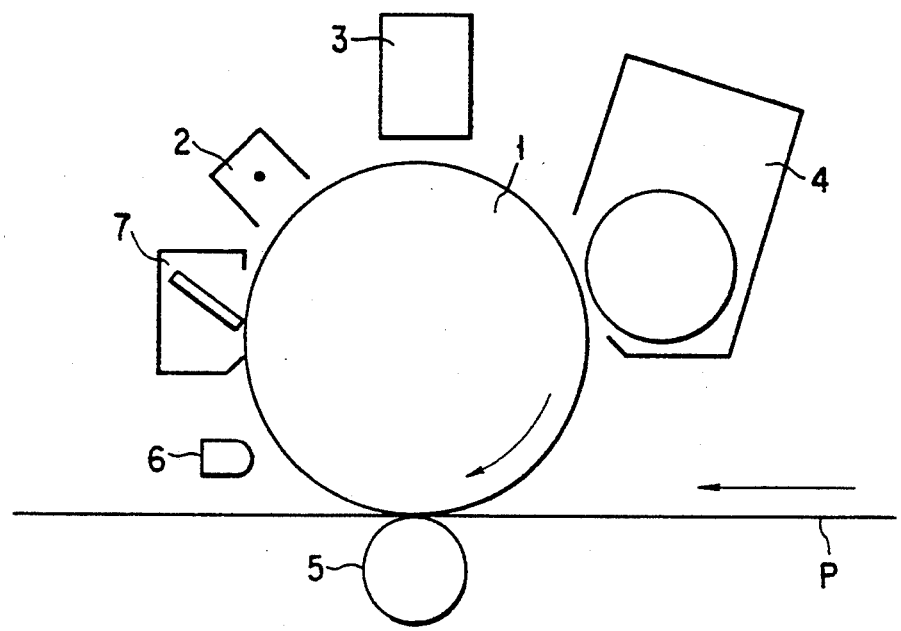
F I G. 1
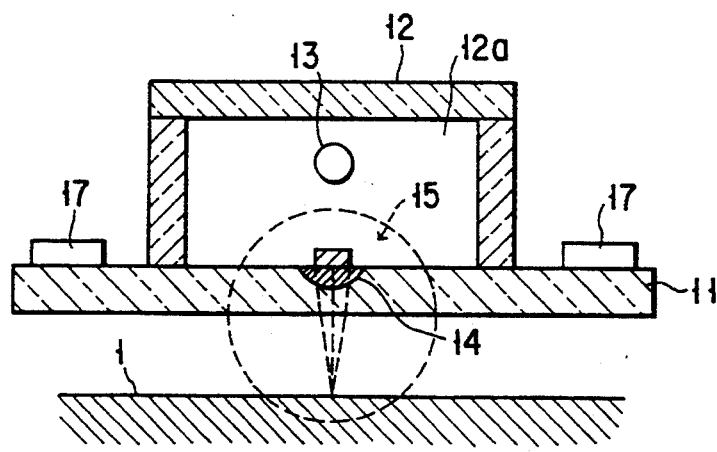
F I G. 2

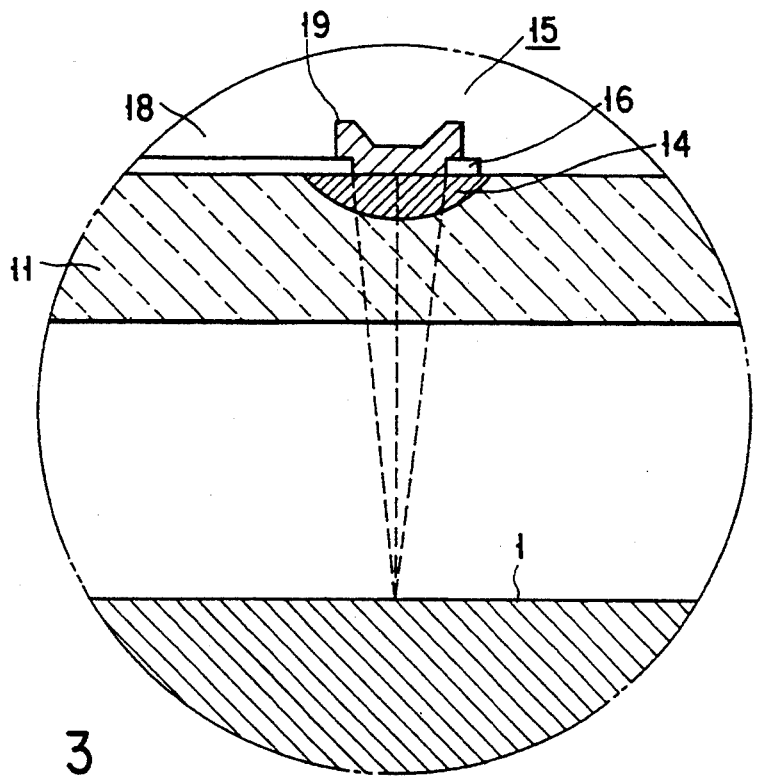
F I G. 3
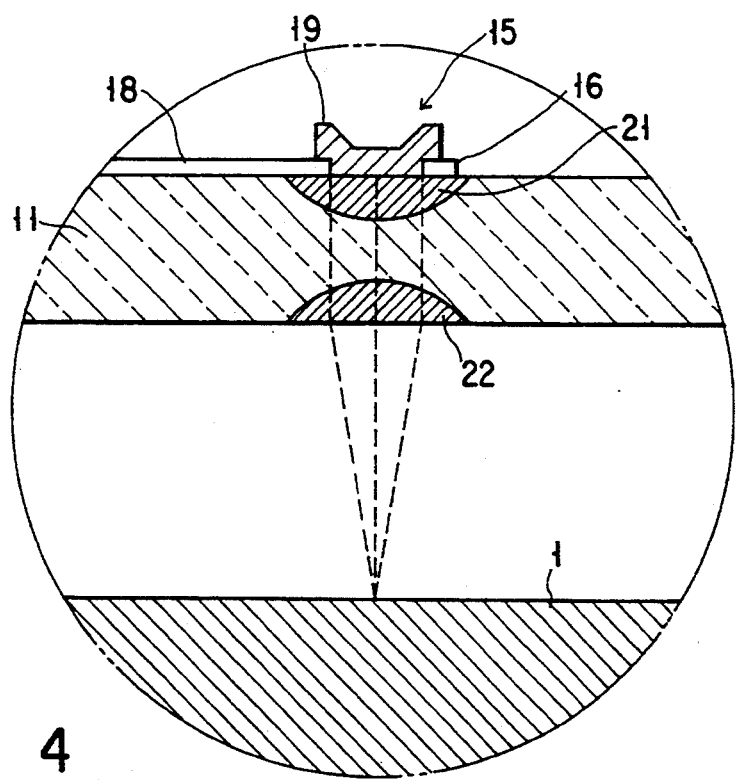
F I G. 4

SOLID STATE SCANNING DEVICE

BACKGROUND OF THE INVENTION

1. Field of the Invention

This invention relates to an exposure apparatus for use in an electrophotography printer, a digital PPC, or a facsimile, etc.

2. Description of the Related Art

An exposure apparatus of this type is disclosed in Published Unexamined Japanese Utility Model Application No. 55-168961.

This apparatus employs an anode substrate which has anodes arranged in a dotted line or dotted lines, and a fluorescent layer formed thereon. Further, there are provided in the apparatus direct heated cathodes above the anode substrate, control electrodes between the cathodes and the anode substrate, and an optical plate having a line or lines of light transmitting fibers buried therein.

In this structure, electrons are discharged from the cathodes onto the fluorescent layer of the anode substrate at the time of exposure, to thereby cause light to be emitted from the fluorescent layer. The emitted light is transmitted through the fibers onto a photosensitive member, forming a latent image thereon.

This exposure apparatus has been used generally in a printer which operates at relatively low speed and has a relatively low resolving power, since it has a structure which is not suitable for increasing its resolving power and brightness.

Specifically, light emitted from the fluorescent member serving as a light emitting element cannot efficiently be utilized in the exposure apparatus, since the light transmitting fibers employed, such as a lens array consisting of light-converging fibers, are separated by some distance from the fluorescent member.

Thus, in order to brighten the light emitting element by use of the lens array, the light emission area of the element must be enlarged. In other words, the resolving power of the printer must be kept low in order to speed up the operation of the same.

On the other hand, in order to enhance the resolving power, the light emission area must be reduced. Reducing the light emission area causes a proportional reduction in the brightness of the same. In order to avoid this, the speed of the operation of the printer must be reduced.

SUMMARY OF THE INVENTION

The present invention has been developed in light of the above circumstances, and its object is to provide an exposure apparatus capable of performing high speed printing with a high resolving power and a high brightness to produce a high quality image, and an image forming apparatus equipped with the exposure apparatus.

According to a first aspect of the invention, there is provided an exposure apparatus comprising:
 a light transmissive member for transmitting light;
 a plurality of light emitting elements, arranged in contact with the light transmissive member, for individually emitting light; and
 a plurality of light converging elements, formed in the light transmissive member, for converging the emitted light from the light emitting elements onto the light receiving member, each of the light converging elements corresponding to each of the light emitting elements.

According to a second aspect of the invention, there is provided an image forming apparatus comprising:
 means for uniformly charging the photoconductive member;
 a first base member arranged at a first position facing to the photoconductive member, the first base member having a first light transmissive portion for transmitting light;
 a second base member arranged on the opposite side to the photoconductive member of the first base member, the second base member having a second light transmissive portion for transmitting light;
 means, arranged on the opposite side to the first base member of the second base member, for emitting light to expose the photoconductive member through the first light transmissive portion and the second light transmissive portion;
 a plurality of liquid crystal members arranged between the first light transmissive portion and the second light transmissive portion, the liquid crystal member having a first molecular orientation and a second molecular orientation, the light is transmitted from the second light transmissive portion to the first light transmissive portion when the liquid crystal member is the first molecular orientation and the light is not transmitted when the liquid crystal member is the second molecular orientation;
 a plurality of light converging elements, formed in the first light transmissive portion, for converging the light from the emitting means onto the photoconductive member so as to form a latent image, each of the light converging elements corresponding to each of the liquid crystal members; and
 means for developing the latent image to form a developed image.

According to a third aspect of the invention, there is provided an image forming apparatus comprising:
 means for uniformly charging the photoconductive member;
 a light transmissive member, arranged facing to the photoconductive member, for transmitting light;
 a plurality of light emitting elements, arranged in contact with a opposite side to the photoconductive member of the light transmissive member, for individually emitting light;
 a plurality of light converging elements, formed in the light transmissive member, for converging the emitted light from the light emitting elements onto the photoconductive member so as to form a latent image, each of the light converging elements corresponding to each of the light emitting elements;
 means for developing the latent image to form a developed image.

According to a fourth aspect of the invention, there is provided an exposure apparatus comprising:
 a light emitting element for emitting light, the light emitting element emitting light when a thermoelectron is collided;
 a first electrode, arranged apart from the light emitting element, for emitting thermoelectrons to
 a second electrode for applying the light emitting element with a predetermined potential so that the thermoelectrons emitted by the first electrode collide against the light emitting element; and a base member for supporting the light emitting element, the first electrode and the second electrode, the base member having a light transmissive portion which transmits the emitted light from the light emitting element to the light receiving member, the light emitting element being arranged in contact with the light transmissive portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view, useful in explaining an image forming process performed in an electrophotography printer, which employs a solid state scanning head according to an embodiment of the invention;

FIG. 2 is a cross sectional view, showing a microlens employed in the solid state scanning head;

FIG. 3 is an enlarged view, showing the microlens and a light emitting element appearing in FIG. 2;

FIG. 4 is a cross sectional view, showing another embodiment of the invention;

DETAILED DESCRIPTION OF THE PREFERRED EMBODIMENTS

Figure 5:
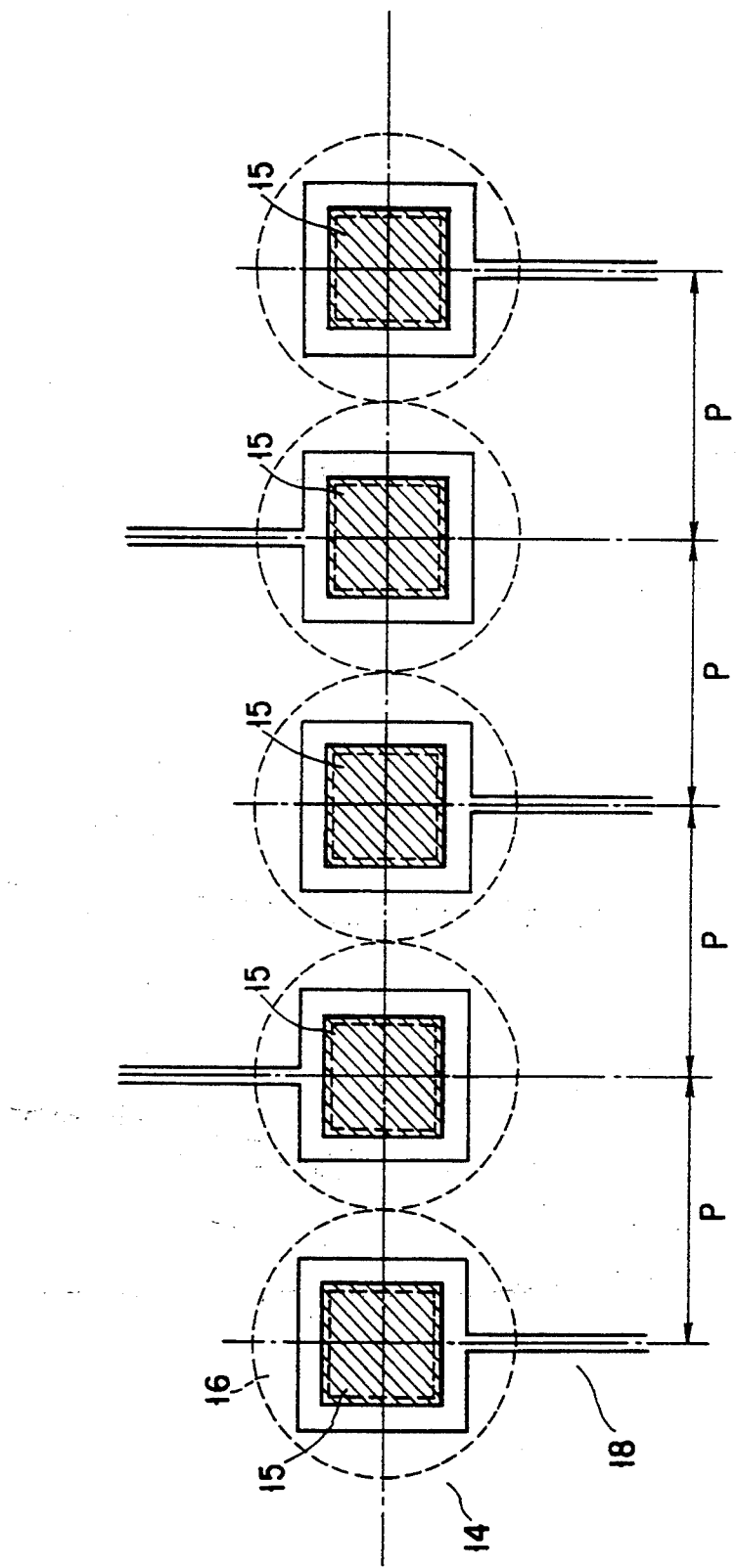
FIG. 5 is a view, showing an arrangement of microlenses, anode electrodes, fluorescent member dots, and Al leads, which are employed in the solid state scanning head of FIG. 1.

The embodiments of the invention will be explained with reference to the accompanying drawings.

FIG. 1 shows an image forming section employed in an electrophotography printer using a solid state scanning head as exposure means.

In the figure, reference numeral 1 denotes a photosensitive drum as a light receiving member, which is rotatable at a given speed in a direction indicated by the arrow. An electrostatic charger 2 for charging the photosensitive drum 1 with a predetermined potential, and a solid state scanning head 3 serving as exposure means for exposing the photosensitive drum 1 charged by the charger 2 are provided around the drum 1 in the direction of rotation thereof.

Further, a developer unit 4 for developing the portion of the drum 1 exposed by the solid state scanning head 3, and a transfer roller 5 for transferring an image developed by the developer unit 4 to a sheet P of paper are provided around the drum 1.

There are further provided around the drum 1 a deelectrifying lamp 6 for removing the remaining potential on the drum 1 after an image is transferred by the transfer roller 5, and a cleaner 7 for removing the toner remaining on the drum 1 after deelectrification by the deelectrifying lamp 6.

At the time of image forming, the photosensitive drum 1 is rotated in the direction indicated by the arrow, and is uniformly charged with electricity during passing the charger 2. Light emitting elements, hereinafter referred to, which are arranged around the charged drum 1 in a one- or two-dimensional manner, selectively emit light onto the drum 1 on the basis of image data supplied from a control unit (not shown), to expose the same. The potential on the portion of the drum 1 which has been exposed is changed to form a latent image corresponding to the image data. Then, toner is attached to the latent image while the image passes the developer unit 4, to visualize the same.

In the meanwhile, a transfer paper sheet P is fed between the transfer roller 5 and the drum 1 from a paper feeder (not shown). A visual image (toner image) is transferred by the transfer roller 5 from the drum 1 to the paper sheet P. The paper sheet P with the visual image is transferred to a fixing section (not shown), where the visual (toner) image on the sheet P is fixed thereon by heating and pressing.

After the transfer of the visual (toner) image, the drum 1 is deelectrified by means of the deelectrifying lamp 6, and toner remaining on the drum 1 is cleaned by the cleaner 7. Subsequently, the cleaned portion of the drum 1 reaches the charger 2.

The electrophotographic printer performs printing on a continuous basis by repeating the above-described process.

Then, the solid state scanning head 3 will be explained in detail.

FIG. 2 shows the cross section of the head 3. In FIG. 2, reference numeral 11 denotes a glass substrate as a transparent substrate. A rectangular glass member 12 having a U-shaped cross section is provided on the glass substrate 11, forming a vacuum chamber 12a together with the substrate 11. The interior of the vacuum chamber 12a is kept under $10^{-8}$ torr or less. A wire cathode 13 coated with an electro-emitting material is attached to the inner surface of the chamber 12a.

A microlens 14 serving as a focusing unit is formed in the portion of the glass substrate 11 which is in the vacuum region. The microlens 14 has a flat surface, and can be handled in the same manner as a flat glass member.

FIG. 3 is an enlarged sectional view, showing a portion indicated by the broken line in FIG. 2. There is provided on the glass substrate 11 a fluorescent dot member 15 comprising an anode 16 which consists of an aluminum thin film wire formed by vacuum evaporation, and a fluorescent member 19 which serves as a light emitting element and is formed integral with the anode 16 as one body.

The fluorescent dot member 15 is formed on the anode 16 by printing or by electrocoating such as photolithography or a lift-off method.

The fluorescent member 19 as an element of the dot member 15 is made, for example, of ZnO which has high speed response of emission and highly bright emission. The upper surface of the microlens 14 is in direct contact with the fluorescent member 19. In other words, the microlens 14 is not separated from the fluorescent member 19.

Corresponding to the fluorescent dot member 15, a driving IC 17 is mounted on the portion of the glass substrate 11 which is located outside the high vacuum region.

An aluminum lead wire 18 formed by vacuum evaporation extends from the anode 16 to the outside of the high vacuum region, and is electrically connected to the driving IC 17 by wire bonding.

The principle of emission will now be explained briefly.

An AC voltage of approx. 5 V (100 KHz) is applied between both opposite ends of the cathode 13 to heat the same. Thus, the cathode (wire) 13 emits thermoelectrons.

On the other hand, a DC voltage of approx. 35 V is applied from the driving IC 17 to the anode 16. The potential difference between the cathode 13 and anode 16 accelerates the thermoelectrons flowing from the cathode 13 to the anode 16, to thereby collide them against the fluorescent member 19. This collision of thermoelectrons causes the fluorescent dot member 15 to emit light (diffused light).

Since, as described above, the fluorescent dot member 15 emits light when a voltage is applied from the driving IC 17 to the anode 16, inputting image data to the driving IC 17 can cause the dot member 15 to selectively emit light in accordance with the image data.

The function of the microlens 14 will be explained.

As explained above, since the microlens 14 is formed in a portion of the glass substrate 11 such that it is in direct contact with the fluorescent dot member 15, that part of the diffused light emitted from the dot member 15 to the glass substrate 11, which is not interrupted by the anode 16, is converged onto the photosensitive drum 1 through the microlens 14. Thus, the light is efficiently guided from the dot member 15 onto the drum 1 in the form shaped by the anode, thus performing high speed printing. Further, if the operation speed of the printer is kept low, the same amount of light can be obtained from a smaller fluorescent member 19, which means that the resolution can be enhanced.

The invention is not limited to the above embodiment, but may be constructed as shown in FIG. 4.

Since in the above-described embodiment, one microlens 14 is used to converge light to each pixel, both the coma-aberration and the spherical aberration must be corrected only by the one surface of the microlens 14. This is because the surface of the microlens 14 which contacts the dot member 15 is flat.

It is a known matter that the coma-aberration and the spherical aberration are hard to correct by use of only one surface.

FIG. 4 shows an example employing two microlenses to overcome the above problem.

As is shown in FIG. 4, a first microlens 21 is provided in one surface of the glass substrate 11 such that it contacts the fluorescent member 19 of the dot member 15, and a second microlens 22 serving as a second light converging unit is provided in the other surface of the substrate 11, opposed to the first microlens 21. The upper surface of the first microlens 21 is at the same level as the one surface of the glass substrate 11, while the lower surface of the first microlens 21 is at the same level as the other surface of the glass substrate 11. To reduce the spherical aberration, the first and second microlenses 21 and 22 must be set to have positive and negative curvatures of substantially the same absolute value. Similarly, the coma aberration can be corrected by adjusting the curvatures and the like of the first and second microlenses 21 and 22.

In the above structure, the light emitted from the dot member 15 enters into the first microlens 21, where it is converted to parallel light with its coma-aberration corrected. The parallel light passes through the glass substrate 11, and enters into the second microlens 22, where its spherical aberration is corrected. Thus, the light with its coma-aberration and spherical aberration corrected is converged onto the photosensitive drum 1.

By virtue of the two microlenses 21 and 22, the light emitted from the fluorescent dot member 15 can be guided to the drum 1 with further accuracy.

A method for forming the microlenses 21 and 22 in the glass substrate 11 will be explained briefly.

First, Ti is deposited on a glass plate, and a circular window is formed by photolithography in the portion of the plate corresponding to a fluorescent dot member formed later. Thereafter, the resultant is dipped in a monovalent ionic nitrate solution heated up to 400° C. or more. At this time, positive ions in the solution are isotropically diffused through the window of the glass plate, thereby causing ion exchange. Ion exchange causes a change in the composition of the glass plate and hence forms refraction index distribution, thus providing the glass plate with a function as a lens.

The lens can have a diameter of 10 $\mu$m–1 mm and a focal distance of 50 $\mu$m–5 mm, and parameters can be set in accordance with the size of the fluorescent dot member, the arrangement pitch, the thickness of the glass substrate, and the distance between the photosensitive drum and the lens.

Then, referring to FIG. 5, an explanation will be given of the arrangement of the microlens 14, anode 16, and fluorescent dot member 15 on the glass surface.

FIG. 5 is a view, showing the glass substrate 11 as viewed from the side of the cathode 13.

As is shown in FIG. 5, both the microlenses 14 and the anodes 16 are formed with a pitch of P. Further, the central point of the microlens 14 accurately corresponds to that of the anode 16. A window is formed in a central portion of the anode 16, and a ZnO layer (fluorescent member) is formed on the window, overlapping with the anode 16 without projecting therefrom.

The light emitted as a result of collision of electrons against the fluorescent ZnO layer reaches the microlens 14 through the window of the anode 16. In general, it is difficult to form a uniform light configuration since ZnO has rough particles. Light having passed through the window of the aluminum anode can have a uniform configuration. An aluminum wire 18 extends from the anode 16 to the driving IC 17.

Figure 6:
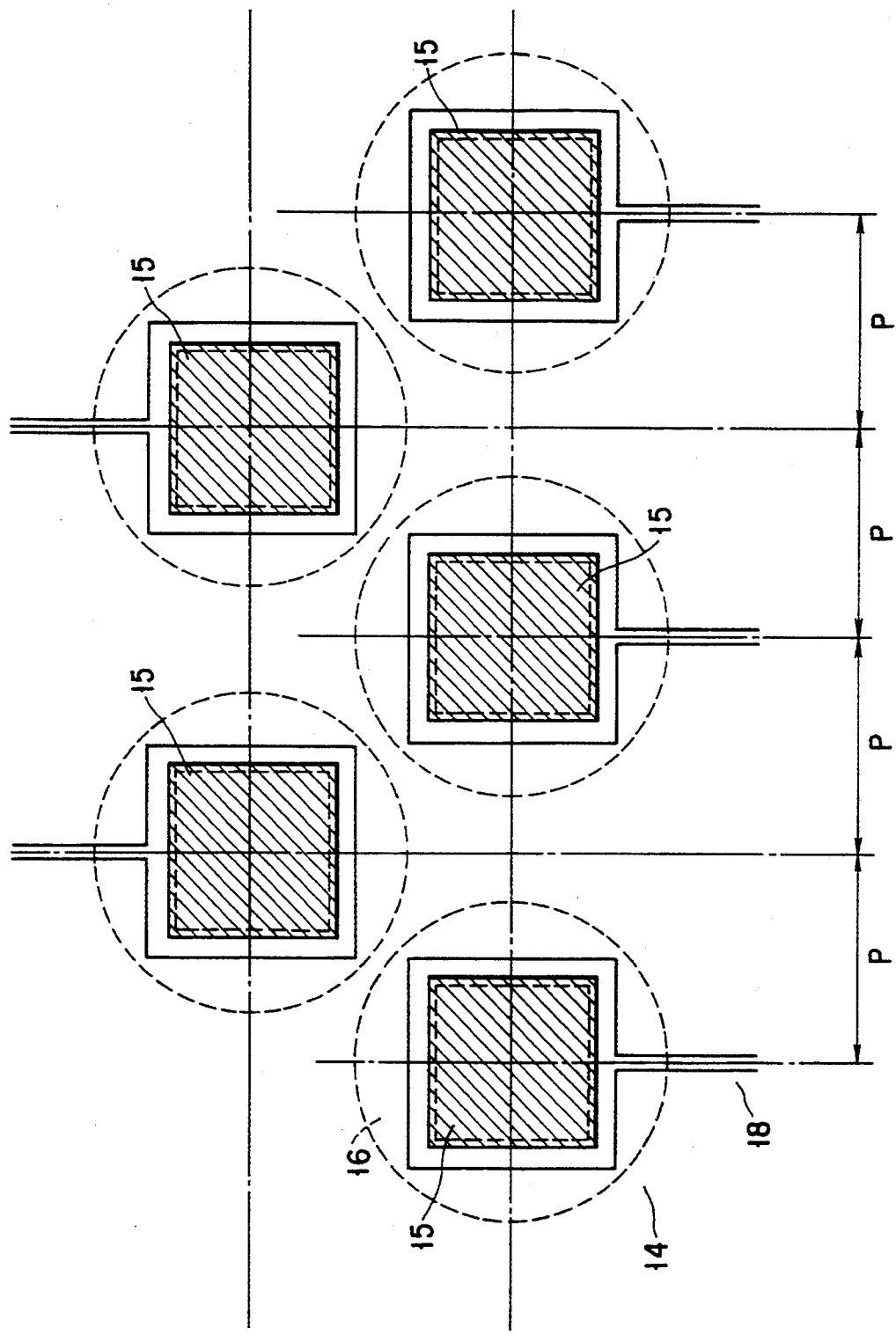
FIG. 6 is a view, showing another arrangement of the microlenses, anode electrodes, fluorescent dot members, and Al leads, which are employed in the solid state scanning head of FIG. 1.

The microlens 14, anode 16, and dot member 15 may be arranged as shown in FIG. 6.

The arrangement of FIG. 6 is a modification of that of FIG. 5, which has been devised to obtain a higher brightness.

This modification is identical to the arrangement of FIG. 5 in the basic structure and the principle of emission, but differs therefrom only in that the microlenses 14, anodes 16, and dot members 15 are arranged in a zigzag manner.

This arrangement can employ a fluorescent dot member 15 of a larger emission area and a larger microlens 14, with the resolution kept as it is.

Like FIG. 5, FIG. 6 shows the glass substrate 11 as viewed from the side of the cathode 13.

Although the microlenses 14, anodes 16, and dot members 15 are arranged in a zigzag manner, the pitch in the main scanning direction is P as in the case of FIG. 5. In this case, however, the diameter φ of the microlens 14 can be made about 1.5 times larger than that of the lens 14 shown in FIG. 5.

Thus, arranging the emission points in a zigzag manner can increase the emission area of the fluorescent dot member 15, and hence the amount of emission.

In the case of the zigzag arrangement, however, the light emission timing must be controlled in accordance with the arrangement. An explanation of the manner of control is omitted here.

Figure 7:
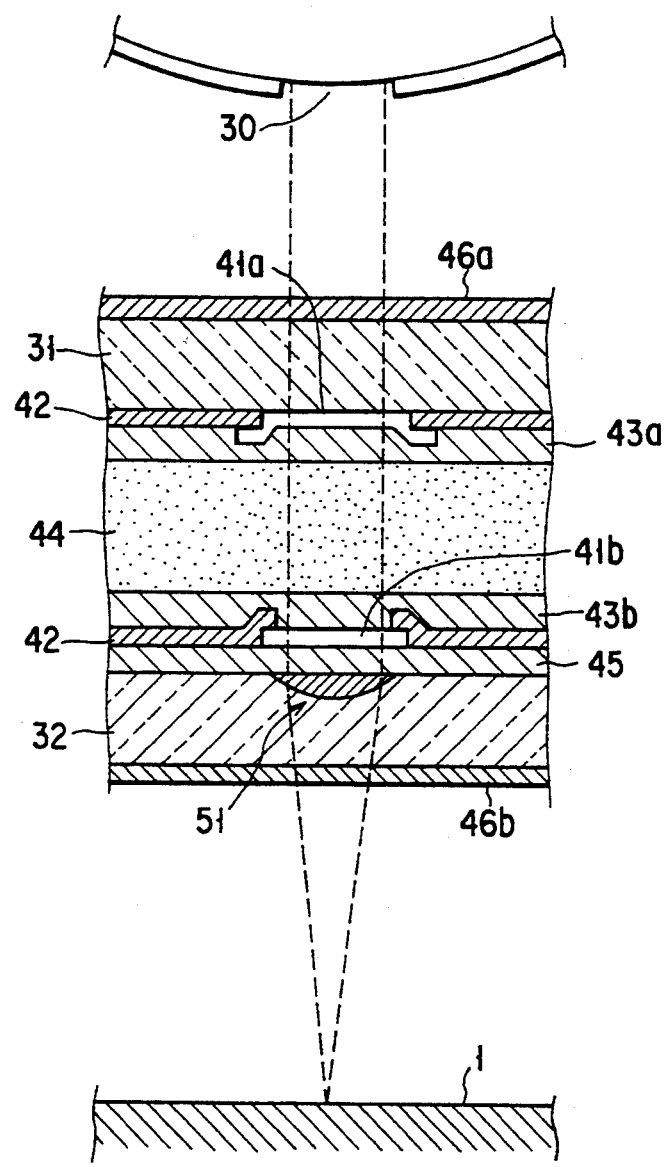
FIG. 7 is a cross sectional view, showing a further embodiment of the invention wherein a microlens is applied to a liquid crystal shutter head.

Moreover, the present invention is applicable also to a liquid crystal shutter array (optical shutter member) as shown in FIG. 7.

Since the liquid crystal shutter array does not emit light, as is generally known, the photosensitive drum 1 is exposed by controlling light emitted from a light source (e.g. a fluorescent lamp) 30 provided in the rear of the array, and utilizing the photoelectric effect of each liquid crystal element (liquid crystal cell).

In general, the liquid crystal shutter array employs two glass substrates 31 and 32 for sealing liquid crystal therebetween. Electrodes 41a and 41b provided on the glass substrates 31 and 32, respectively, are controlled to change the orientation of liquid crystal molecules in a liquid crystal layer so as to control the amount of light passing therethrough.

In this embodiment, an explanation will be given of a case employing a liquid crystal shutter array of a torsion nematic (TN) type. Deflectors 46a and 46b are provided on the respective outer surfaces of the glass substrates 31 and 32 so that light beams having passed therethrough can be perpendicular to each other. The liquid crystal layer 44 is provided between the glass substrates 31 and 32. The layer 44 has a rotary polarization of 90° when no electric field is generated. Therefore, light from the light source 30 passes the deflector 46a, and is rotated through 90° along twisted orientation of liquid crystal molecules in the liquid crystal layer 44. Thus, the light having passed the liquid crystal layer 44 passes another deflector 46b.

When, on the other hand, an electric field is generated, the liquid crystal layer 44 has no rotary polarization since the liquid crystal molecules of the layer 44 are arranged in parallel with the line of the direction of electrolysis. Thus, the light emitted from the light source 30 and having passed the deflector 46a and the layer 44 cannot pass the deflector 46b.

ITOs (indium oxide films) 41a and 41b formed on the opposite sides of the layer 44 are transparent electrodes for generating an electric field to change the molecular orientation of the layer 44. The electrode (ITO) 41a located on the side of the light source 30 serves as a common electrode for applying the same potential to each liquid crystal shutter. The shape of each liquid crystal shutter is defined by a light interruption film (Cr) formed around the electrode 41a.

The potential of the electrode (ITO) 41b is controlled by a thin film transistor (not shown) extending from the aluminum wire 42, thereby controlling the molecular orientation of each liquid crystal shutter.

Polyimide layers 43a and 43b formed on the electrodes 41a and 41b, respectively, serve as molecular orientation layers for obtaining uniform and stable orientation of liquid crystal molecules. A SiNx layer 45 formed between the glass substrate 32 and the electrode 41b is a transparent insulating film.

Further, a microlens 51 serving as a light converging unit is formed in the glass substrate 32, and is opposed to the electrode 41b with the SiNx layer 45 interposed therebetween. By virtue of the microlens 51, the light having passed the liquid crystal layer 44 can effectively be guided onto the photosensitive drum 1.

The molecular orientation of the liquid crystal shutter is controlled as described above, to control the amount of light (i.e., exposure amount) radiated onto the photosensitive drum 1.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An exposure apparatus for exposing a light receiving member, comprising:
   light transmissive member for transmitting light;
   a plurality of light emitting elements, arranged in contact with the light transmissive member, for individually emitting light; and
   a plurality of lenses located in the light transmissive member, for converging the emitted light from the light emitting elements onto the light receiving member, each of the lenses corresponding to one of the light emitting elements, each of the lenses having a first converging unit formed in one surface of the light transmissive member located corresponding to the light emitting elements, and a second converging unit having a curvature which corrects a coma aberration and/or a spherical aberration in cooperation with the curvature of the first converging unit, formed in the other surface of the light transmissive member and opposed to the first converging unit, the lenses converging onto the light receiving member, the light emitted from the light emitting elements through the first and second converging units.

2. An image forming apparatus for forming an image on a photoconductive member, comprising:
   means for uniformly charging the photoconductive member;
   a light transmissive member, arranged facing toward the photoconductive member, for transmitting light;
   a plurality of light emitting elements, arranged in contact with an opposite side to the photoconductive member of the light transmissive member, for individually emitting light;
   a plurality of lenses located in the light transmissive member, for converging the emitted light from the light emitting elements onto the photoconductive member so as to form a latent image, each of the lenses corresponding to one of the light emitting elements; and
   means for developing the latent image to form a developed image,
   wherein the light transmissive member has a flat surface and
   wherein the lenses have a first converging unit formed in one surface of the light transmissive member at a location corresponding to the light emitting elements, and a second converging unit having a curvature which corrects a coma aberration and/or a spherical aberration in cooperation with the curvature of the first converging unit, formed in the other surface of the light transmissive member and opposed to the first converging unit, the lenses converging onto the light receiving member the light emitted from the light emitting elements through the first and second converging units.

3. An image forming apparatus for forming an image on an photoconductive member, comprising:

means for uniformly charging the photoconductive member;

a first base member arranged at a first position facing to the photoconductive member, the first base member having a first light transmissive portion for transmitting light;

a second base member arranged on the opposite side to the photoconductive member of the first base member, the second base member having a second light transmissive portion for transmitting light;

means, arranged on the opposite side to the first base member of the second base member, for emitting light to expose the photoconductive member through the first light transmissive portion and the second light transmissive portion;

a plurality of liquid crystal members arranged between the first light transmissive portion and the second light transmissive portion, the liquid crystal member having a first molecular orientation and a second molecular orientation, the light is transmitted from the second light transmissive portion to the first light transmissive portion when the liquid crystal member is the first molecular orientation and the light is not transmitted when the liquid crystal member is the second molecular orientation;

a plurality of light converging elements, formed in the first light transmissive portion, for converging the light from the emitting means onto the photoconductive member so as to form a latent image, each of the light converging elements corresponding to each of the liquid crystal members; and means for developing the latent image to form a developed image.

4. The image forming apparatus according to claim 3, wherein the first light transmissive portion has a flat surface, and the light converging elements includes a microlens formed in the first light transmissive portion.

5. The image forming apparatus according to claim 3, wherein each of the liquid crystal members has an electrode for changing the molecular orientation of the liquid crystal members by generating an electric field.

* * * * *